(12) United States Patent
Cole et al.

(10) Patent No.: US 7,557,819 B2
(45) Date of Patent: Jul. 7, 2009

(54) IMAGE DISPLAY SYSTEM AND METHOD INCLUDING OPTICAL SCALING

(75) Inventors: James R Cole, Albany, OR (US); David A Williams, Corvallis, OR (US); Michael A Pate, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 596 days.

(21) Appl. No.: 11/192,641

(22) Filed: Jul. 28, 2005

(65) Prior Publication Data

US 2005/0259122 A1    Nov. 24, 2005

Related U.S. Application Data

(62) Division of application No. 10/386,084, filed on Mar. 11, 2003, now Pat. No. 7,098,936.

(51) Int. Cl.
*G09G 5/02* (2006.01)
(52) U.S. Cl. .................... 345/698; 348/14.12; 348/264; 348/556
(58) Field of Classification Search ................. 345/698, 345/581, 629; 348/14.12, 445, 264, 474, 348/556; 382/284, 294
See application file for complete search history.

(56) References Cited

U.S. PATENT DOCUMENTS

| | | |
|---|---|---|
| 4,662,746 A | 5/1987 | Hornbeck |
| 4,956,619 A | 9/1990 | Hornbeck |
| 5,061,049 A | 10/1991 | Hornbeck |
| 5,083,857 A | 1/1992 | Hornbeck |
| 5,309,241 A | 5/1994 | Hoagland |
| 5,386,253 A | 1/1995 | Fielding |
| 5,402,184 A | 3/1995 | O'Grady et al. |
| 5,490,009 A | 2/1996 | Venkateswar et al. |
| 5,530,482 A | 6/1996 | Gove et al. |
| 5,689,283 A | 11/1997 | Shirochi |
| 5,729,245 A | 3/1998 | Gove et al. |

(Continued)

FOREIGN PATENT DOCUMENTS

EP            0802671         10/1997

(Continued)

OTHER PUBLICATIONS

T. Tokita et al., "P-108: FLC Resolution-Enhancing Device for Projection Displays", SID 02 Digest, 2002, pp. 638-641.

(Continued)

*Primary Examiner*—Abbas I Abdulselam

(57) ABSTRACT

A method of displaying an image having a first aspect ratio with a display device having a second aspect ratio includes receiving image data for the image, buffering the image data and creating a frame of the image at the first aspect ratio, defining a first sub-frame and a second sub-frame for the frame of the image at the second aspect ratio, including spatially offsetting the second sub-frame from the first sub-frame in one direction, and alternating between displaying the first sub-frame in a first position and the second sub-frame in a second position spatially offset from the first position with the display device, including optically scaling a displayed image of the first sub-frame and a displayed image of the second sub-frame in the one direction.

8 Claims, 8 Drawing Sheets

U.S. PATENT DOCUMENTS

| | | |
|---|---|---|
| 5,742,274 A | 4/1998 | Henry et al. |
| 5,757,355 A | 5/1998 | Ogura et al. |
| 5,842,762 A | 12/1998 | Clarke |
| 5,897,191 A | 4/1999 | Clarke |
| 5,930,050 A | 7/1999 | Dewald |
| 5,978,518 A | 11/1999 | Oliyide et al. |
| 6,025,951 A | 2/2000 | Swart et al. |
| 6,104,375 A | 8/2000 | Lam |
| 6,141,039 A | 10/2000 | Poetsch |
| 6,184,969 B1 | 2/2001 | Fergason |
| 6,188,382 B1 | 2/2001 | Okamura et al. |
| 6,219,017 B1 | 4/2001 | Shimada et al. |
| 6,239,783 B1 | 5/2001 | Hill et al. |
| 6,265,736 B1 | 7/2001 | Dillen et al. |
| 6,313,888 B1 | 11/2001 | Tabata |
| 6,317,171 B1 * | 11/2001 | Dewald .................. 348/756 |
| 6,384,816 B1 | 5/2002 | Tabata |
| 6,393,145 B2 | 5/2002 | Betrisey et al. |
| 6,657,603 B1 | 12/2003 | Demetrescu et al. |
| 6,825,835 B2 | 11/2004 | Sano et al. |
| 7,098,936 B2 * | 8/2006 | Cole et al. .................. 345/698 |
| 2002/0110197 A1 | 8/2002 | Pearlstein et al. |
| 2003/0011614 A1 | 1/2003 | Itoh et al. |
| 2003/0020809 A1 | 1/2003 | Gibbon et al. |
| 2003/0021347 A1 | 1/2003 | Lan et al. |
| 2003/0133060 A1 | 7/2003 | Shimada |

FOREIGN PATENT DOCUMENTS

| | | |
|---|---|---|
| EP | 1001306 A2 | 5/2000 |
| EP | 1303136 | 4/2003 |

OTHER PUBLICATIONS

D. Chen, "Display Resolution Enhancement With Optical Scanners", Applied Optics, vol. 40, No. 5, Feb. 10, 2001, pp. 636-643.

A. Yasuda et al., "FLC Wobbling For High-Resolution Projectors", Journal of the SID 5/3, 1997, pp. 299-305.

"Runco Maximizes Digital Processing Technology: New Line of Anamorphic Lens for Reflection Series Projectors", Runco Press Releases, 2001, 2 pages, retrieved from the Internet: [http://www.runco.com/About US/Press/2001/AOS.htm].

N. Suzuki et al., "Matrix Conversion of Improvement of Vertical-Temporal Resolution in Letter-Box Wide-Aspect", SMPTE Journal, Feb. 1991, pp. 104-110.

G. deHaan et al, "IC for Motion-Compensated 100 Hz TV with Natural-Motion Movie-Mode", IEEE, 1996, pp. 165-174.

Sang-Hoon Yim et al, "An Image Improving Method for Delta Subpizel Displays", SID 03 Digest, 828-831.

A. Pelagotti et al, "High Quality Video on Multimedia PC's", 1999 IEEE, pp. 872-876.

* cited by examiner (WITH TWO-POSITION PROCESSING)

(WITHOUT PROCESSING)

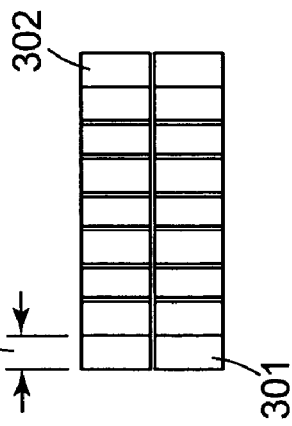
Fig. 8C
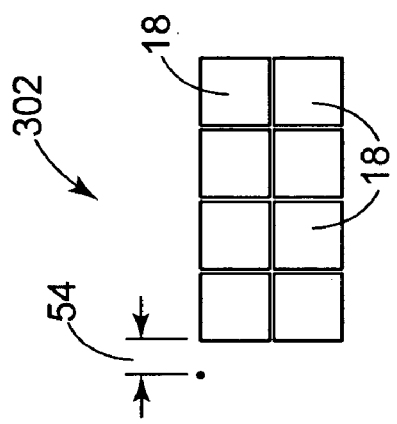
Fig. 8B
Fig. 8D
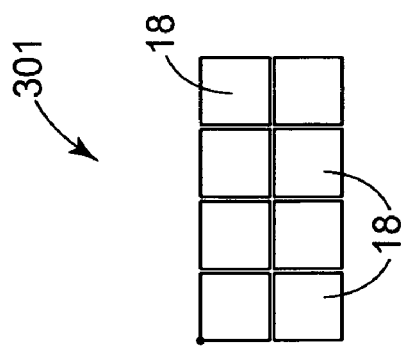
Fig. 8A

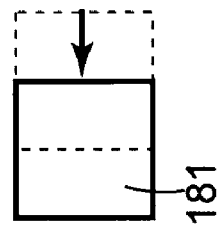
*Fig. 9C*
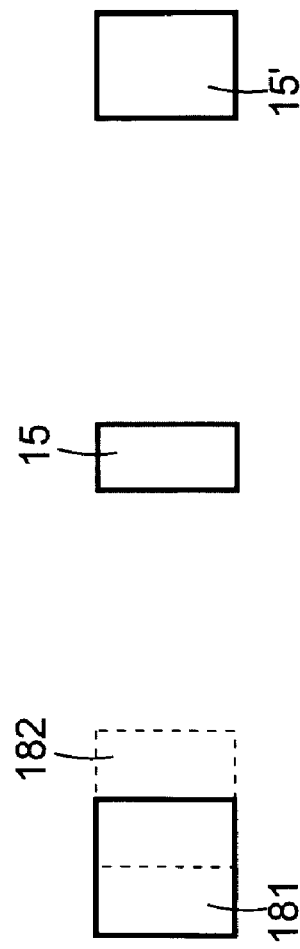
*Fig. 10C*
*Fig. 9B*
*Fig. 10B*
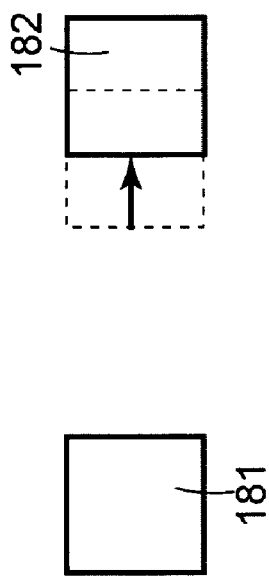
*Fig. 9A*
*Fig. 10A*

IMAGE DISPLAY SYSTEM AND METHOD INCLUDING OPTICAL SCALING

This application is a divisional of Ser. No. 10/386,084, filed Mar. 11, 2003, now U.S. Pat. No. 7,098,936 which is hereby incorporated by reference.

CROSS-REFERENCE TO RELATED APPLICATIONS

This application is related to U.S. patent application Ser. No. 10/213,555, filed on Aug. 7, 2002, and related to U.S. patent application Ser. No. 10/242,545, filed on Sep. 11, 2002, both assigned to the assignee of the present invention, and incorporated herein by reference.

THE FIELD OF THE INVENTION

The present invention relates generally to imaging systems, and more particularly to a system and method of displaying an image.

BACKGROUND OF THE INVENTION

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Often, the resolution of the image data and the resolution of the display device differ. More specifically, an aspect ratio, defined as the ratio of image width to image height, of the image data may differ from an aspect ratio of the display device. For example, the image data may be high definition image data having a 16:9 aspect ratio while the display device may have a conventional 4:3 aspect ratio. Conversely, the image data may have a conventional 4:3 aspect ratio while the display device has an enhanced 16:9 aspect ratio. Regardless, the image data and the display device have differing aspect ratios, thereby limiting display of the image data on the display device.

Conventional techniques for accommodating differing formats of image data and a display device use, for example, sampling or scaling of the image data so that the image fills the display device in at least one dimension. These techniques, however, produce an image which underfills the display device in an orthogonal dimension thereby resulting in blank spaces above and below or to the left and the right of the image. Thus, a resolution of the image is reduced. In addition, sampling or scaling of the image data may result in an image which appears compressed or stretched in one dimension.

Accordingly, it is desired to accommodate the display of an image having one aspect ratio with a display device having another aspect ratio.

SUMMARY OF THE INVENTION

One aspect of the present invention provides a method of displaying an image having a first aspect ratio with a display device having a second aspect ratio. The method includes receiving image data for the image, buffering the image data and creating a frame of the image at the first aspect ratio, defining a first sub-frame and a second sub-frame for the frame of the image at the second aspect ratio, including spatially offsetting the second sub-frame from the first sub-frame in one direction, and alternating between displaying the first sub-frame in a first position and the second sub-frame in a second position spatially offset from the first position with the display device, including optically scaling a displayed image of the first sub-frame and a displayed image of the second sub-frame in the one direction.

BRIEF DESCRIPTION OF THE DRAWINGS

FIGS. 8A-8D are schematic illustrations of one embodiment of processing and displaying image sub-frames of an image according to the present invention.

FIGS. 9A-9C are schematic illustrations of one embodiment of displaying pixels of the image sub-frames of FIGS. 8A and 8B with an image display system according to the present invention.

FIGS. 10A-10C are schematic illustrations of one embodiment of displaying pixels of an image with optical scaling according to the present invention.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
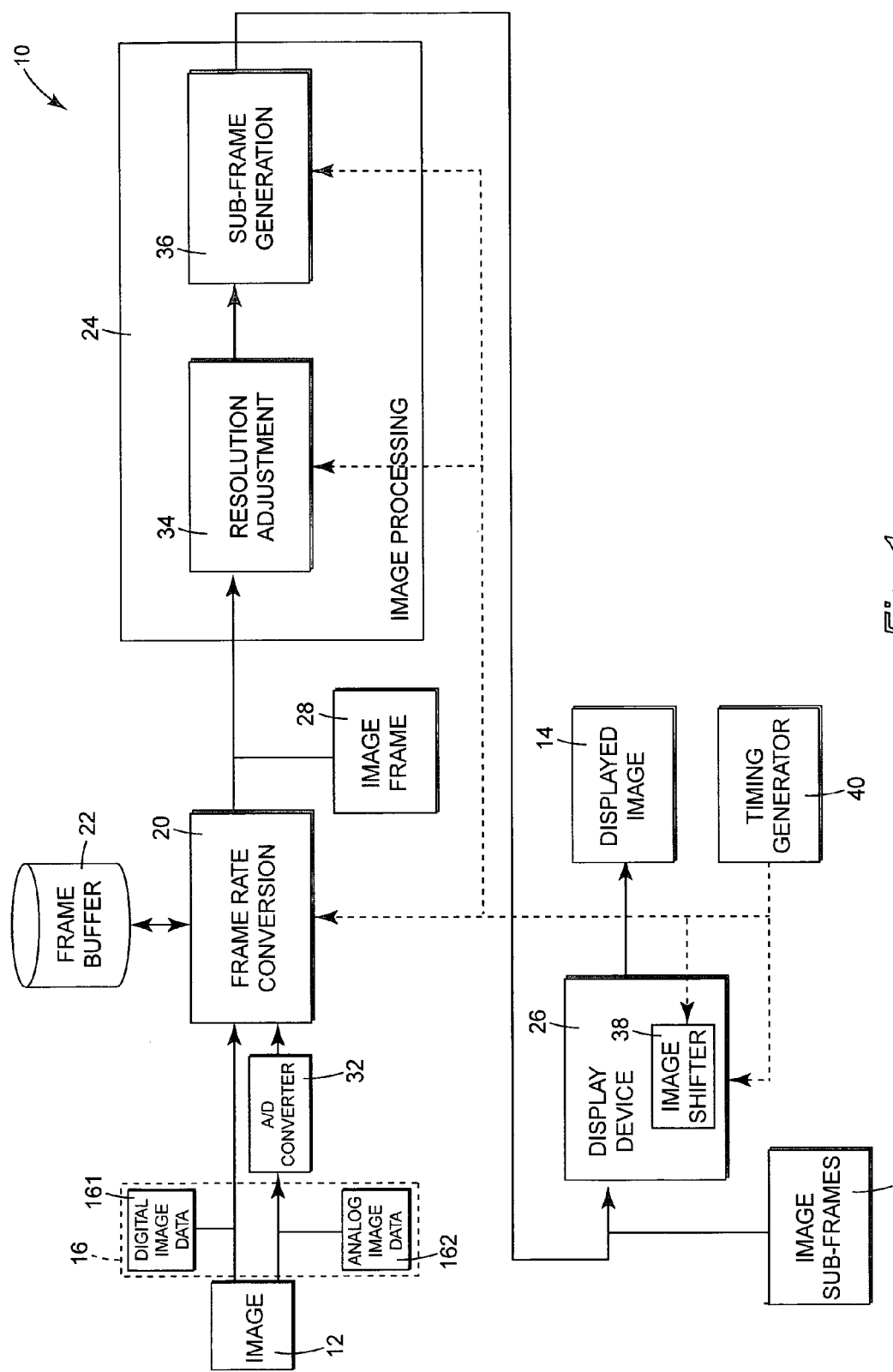
FIG. 1 is a block diagram illustrating one embodiment of an image display system.

FIG. 1 illustrates one embodiment of an image display system 10. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. In addition, image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In one embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28 and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to match the resolution of display device 26. For example, image processing unit 24 increases, decreases, and/or leaves unaltered the resolution of image data 16 so as to match the resolution of display device 26. Thus, by matching the resolution of image data 16 to the resolution of display device 26, display device 26 can display image data 16. Accordingly, with image processing unit 24, image display system 10 can receive and display image data 16 of varying resolutions.

In one embodiment, image processing unit 24 increases a resolution of image data 16. For example, image data 16 may be of a resolution less than that of display device 26. More specifically, image data 16 may include lower resolution data, such as 400 pixels by 300 pixels, and display device 26 may support higher resolution data, such as 800 pixels by 600 pixels. As such, image processing unit 24 processes image data 16 to increase the resolution of image data 16 to the resolution of display device 26. Image processing unit 24 may increase the resolution of image data 16 by, for example, pixel replication, interpolation, and/or any other resolution synthesis or generation technique.

In one embodiment, image processing unit 24 decreases a resolution of image data 16. For example, image data 16 may be of a resolution greater than that of display device 26. More specifically, image data 16 may include higher resolution data, such as 1600 pixels by 1200 pixels, and display device 26 may support lower resolution data, such as 800 pixels by 600 pixels. As such, image processing unit 24 processes image data 16 to decrease the resolution of image data 16 to the resolution of display device 26. Image processing unit 24 may decrease the resolution of image data 16 by, for example, sub-sampling, interpolation, and/or any other resolution reduction technique.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26. Image sub-frames 30 are each of an area equal to image frame 28 and each include a plurality of columns and a plurality of rows of individual pixels representing a subset of image data 16 of image 12 and have a resolution which matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 completes one cycle of displaying image sub-frames 30 for image frame 28. Thus, display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 to the resolution of display device 26 and generate image sub-frames 30, and display and positioning of image sub-frames 30 to produce displayed image 14. Accordingly, timing generator 40 controls timing of image display system 10 such that entire sub-frames of image 12 are temporally and spatially displayed by display device 26 as displayed image 14.

Figure 2C:
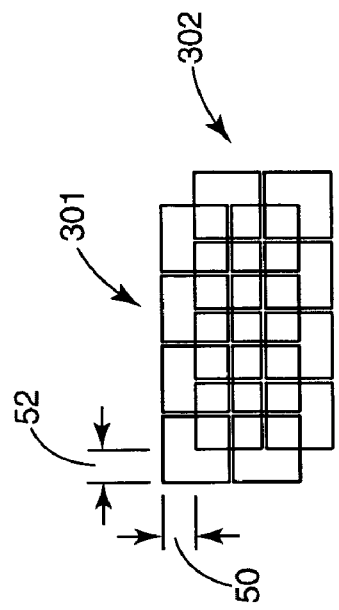
FIGS. 2A-2C are schematic illustrations of one embodiment of processing and displaying a frame of an image according to the present invention.
Figure 2B:
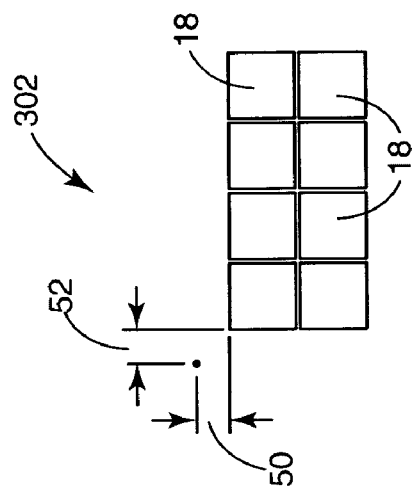
Figure 2A:
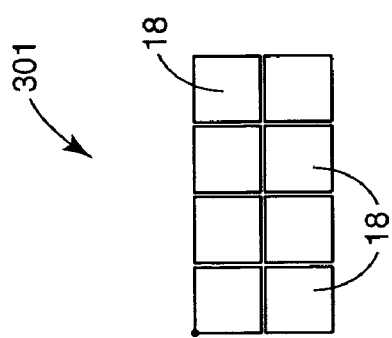

In one embodiment, as illustrated in FIGS. 2A and 2B, image processing unit 24 defines a plurality of image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16. Thus, first sub-frame 301 and second sub-frame 302 each constitute an image data array or pixel matrix of a subset of image data 16.

In one embodiment, as illustrated in FIG. 2B, second sub-frame 302 is offset from first sub-frame 301 by a vertical distance 50 and a horizontal distance 52. As such, second sub-frame 302 is spatially offset from first sub-frame 301 by a predetermined distance. In one illustrative embodiment, vertical distance 50 and horizontal distance 52 are each approximately one-half of one pixel.

As illustrated in FIG. 2C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by vertical distance 50 and horizontal distance 52. As such, pixels of first sub-frame 301 overlap pixels of second sub-frame 302. In one embodiment, display device 26 completes one cycle of displaying first sub-frame 301 in the first position and displaying second sub-frame 302 in the second position for image frame 28. Thus, second sub-frame 302 is spatially and temporally displayed relative to first sub-frame 301.

Figure 3C:
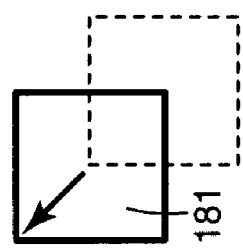
FIGS. 3A-3C are schematic illustrations of one embodiment of displaying a pixel with an image display system according to the present invention.
Figure 3B:
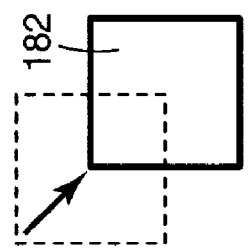
Figure 3A:
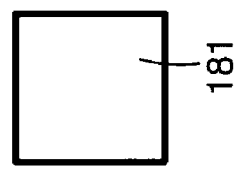

FIGS. 3A-3C illustrate one embodiment of completing one cycle of displaying a pixel 181 from first sub-frame 301 in the first position and displaying a pixel 182 from second sub-frame 302 in the second position. More specifically, FIG. 3A illustrates display of pixel 181 from first sub-frame 301 in the first position, FIG. 3B illustrates display of pixel 182 from second sub-frame 302 in the second position (with the first position being illustrated by dashed lines), and FIG. 3C illustrates display of pixel 181 from first sub-frame 301 in the first position (with the second position being illustrated by dashed lines).

Figure 5:
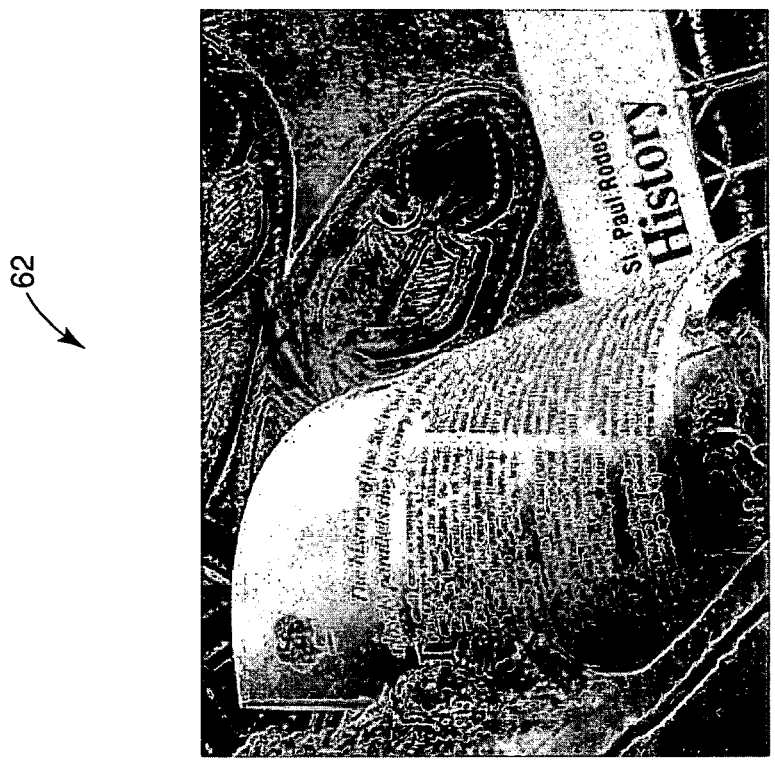
FIG. 5 is a simulation of one embodiment of an enlarged image portion produced with processing by an image display system according to the present invention.
Figure 4:
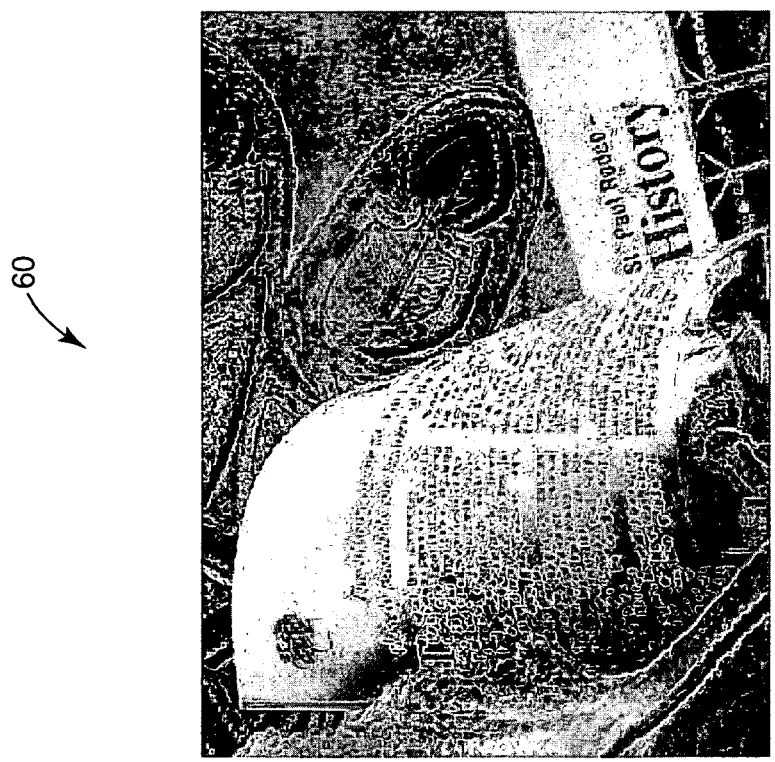
FIG. 4 is a simulation of one embodiment of an enlarged image portion produced without processing by an image display system according to the present invention.

FIGS. 4 and 5 illustrate enlarged image portions produced from the same image data without and with, respectively, image processing by image display system 10. More specifically, FIG. 4 illustrates an enlarged image portion 60 produced without processing by image display system 10. As illustrated in FIG. 4, enlarged image portion 60 appears pixelated with individual pixels being readily visible. In addition, enlarged image portion 60 is of a lower resolution.

FIG. 5, however, illustrates an enlarged image portion 62 produced with processing by image display system 10. As illustrated in FIG. 5, enlarged image portion 62 does not appear as pixelated as enlarged image portion 60 of FIG. 4. Thus, image quality of enlarged image portion 62 is enhanced with image display system 10. More specifically, resolution of enlarged image portion 62 is improved or increased compared to enlarged image portion 60.

In one illustrative embodiment, enlarged image portion 62 is produced by two-position processing including a first sub-frame and a second sub-frame, as described above. Thus, twice the amount of pixel data is used to create enlarged image portion 62 as compared to the amount of pixel data used to create enlarged image portion 60. Accordingly, with two-position processing, the resolution of enlarged image portion 62 is increased relative to the resolution of enlarged image portion 60 by a factor of approximately 1.4 or the square root of two.

Figure 6:
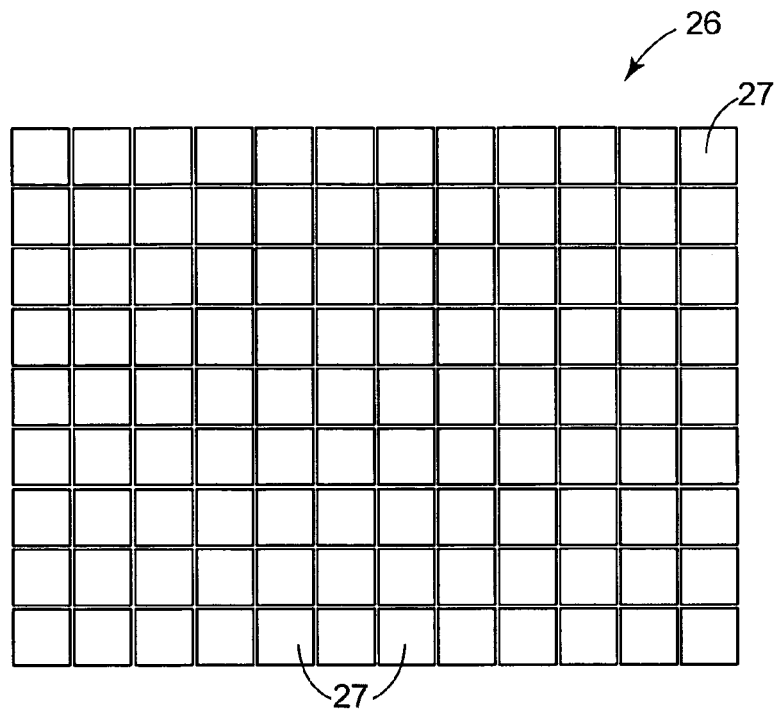
FIG. 6 is a schematic illustration of one embodiment of a display device having one aspect ratio.

In one embodiment, as illustrated in FIG. 6, display device 26 includes a plurality of columns and a plurality of rows of individual pixels 27 for producing image 12. As such, display device 26 has an aspect ratio defined as a ratio of display width to display height. In one exemplary embodiment, display device 26 has an aspect ratio of 4:3. Thus, display device 26 has a width of 4n units and a height of 3n units. For example, display device 26 may have a resolution of 1024 pixels×768 pixels (n=256).

Figure 7:
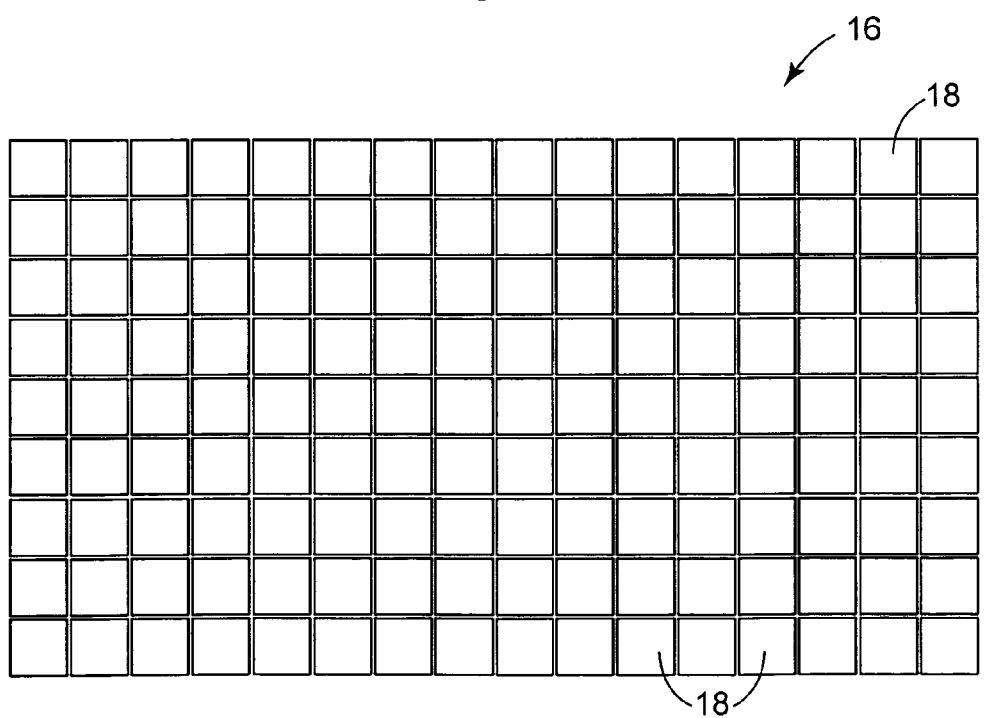
FIG. 7 is a schematic illustration of one embodiment of a frame of an image having another aspect ratio.

In one embodiment, as illustrated in FIG. 7, image data 16 includes a plurality of columns and a plurality of rows of individual pixels 18 for image 12. As described above, image frame buffer 22 (FIG. 1) receives and buffers image data 16 for image 12 to create image frame 28. As such, image frame 28 is defined to include a plurality of individual lines or fields of image data 16 representing an entirety of image 12. Thus, image frame 28 includes a plurality of columns and a plurality of rows of individual pixels representing image 12. Image frame 28, therefore, has an aspect ratio defined as a ratio of image width to image height.

In one exemplary embodiment, image data 16 is high resolution image data such that image frame 28 has an aspect ratio of 16:9. Thus, image frame 28 for image 12 has a width of 16n units and a height of 9n units. For example, image frame 28 may have a resolution of 1024 pixels×576 pixels (n=64). In the exemplary embodiments described herein, the resolution and, more specifically, aspect ratio of image frame 28 for image 12, therefore, differs from the resolution and, more specifically, aspect ratio of display device 26.

In one embodiment, as illustrated in FIGS. 8A and 8B, image processing unit 24 (FIG. 1) defines a plurality of image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16.

In one embodiment, as described above, image processing unit 24 (FIG. 1) and, more specifically, sub-frame generation unit 36 of image processing unit 24 receives and processes image data 16 for image frame 28 to define image sub-frames 30. In one embodiment, sub-frame generation unit 36 generates image sub-frames 30 with a resolution and, more specifically, an aspect ratio which matches the resolution and, more specifically, aspect ratio of display device 26.

In one embodiment, as illustrated in FIG. 8B, second sub-frame 302 is offset from first sub-frame 301 by a horizontal distance 54. As such, second sub-frame 302 is spatially offset from first sub-frame 301 by a predetermined distance. In one illustrative embodiment, horizontal distance 54 is approximately one-half of one pixel.

As illustrated in the embodiment of FIG. 8C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by horizontal distance 54. As such, pixels of first sub-frame 301 overlap pixels of second sub-frame 302.

As illustrated schematically in the embodiment of FIG. 8D, image sub-frames 30 are shifted in a two-position horizontal pattern between respective positions A and B. In one embodiment, display device 26 completes on cycle of displaying first sub-frame 301 in the first position and displaying second sub-frame 302 in the second position for image frame 28. Thus, second sub-frame 302 is spatially and temporally displayed relative to first sub-frame 301.

FIGS. 9A-9C illustrate one embodiment of completing one cycle of display of a pixel 181 from first sub-frame 301 in the first position and displaying a pixel 182 from second sub-frame 302 in the second position. More specifically, FIG. 9A illustrates display of pixel 181 from first sub-frame 301 in the first position, FIG. 9B illustrates display of pixel 182 from second sub-frame 302 in the second position (with the first position being illustrated by dashed lines), and FIG. 9C illustrates display of pixel 181 from first sub-frame 301 in the first position (with the second position being illustrated by dashed lines).

With image sub-frames 30 being spatially offset from each other in a horizontal direction and with two-position horizontal processing, as illustrated and described above, twice the amount of pixel data is used to create each pixel of displayed image 14. As such, in this embodiment, the resolution of displayed image 14 is increased in the horizontal direction.

FIGS. 10A-10C illustrate one embodiment of displaying pixels of displayed image 14 with optical scaling. In one embodiment, as described above and as illustrated in FIG. 10A, image display system 10 alternates between displaying first sub-frame 301 and second sub-frame 302 for image 12 such that pixels 181 of first sub-frame 301 and pixels 182 of second sub-frame 302 overlap. In this embodiment, as pixels of first sub-frame 301 and second sub-frame 302 overlap in the horizontal direction, resolution of displayed image 14 is increased in the horizontal direction.

As illustrated in the embodiment of FIG. 10B, the overlapping pixels of first sub-frame 301 and second sub-frame 302 produce a displayed image portion 15 of displayed image 14. In this embodiment, displayed image portion 15 has an increased resolution in the horizontal direction since twice as much pixel data (pixel data from first sub-frame 301 and pixel data from second sub-frame 302) is used to generate displayed image portion 15. Displayed image portion 15, however, is compressed in the horizontal direction, thereby resulting in distortion of displayed image 14 in the horizontal direction for the desired aspect ratio.

In one embodiment, as illustrated in FIG. 10C, image display system 10 enhances the resolution of displayed image 14 by optically scaling displayed image 14. More specifically, pixels 181 of first sub-frame 301 and pixels 182 of second sub-frame 302 which create displayed image portion 15 of displayed image 14 are optically scaled in the direction of increased resolution. For example, in the illustrative embodiment described above, pixels forming displayed image portion 15 are optically scaled in the horizontal direction. As such, an optically scaled displayed image portion 15' is produced. Thus, image display system 10 uncompresses displayed image portion 15 and reduces distortion of displayed image portion 15 in the horizontal direction.

In one embodiment, image display system 10 optically scales pixels forming displayed image 14 by a ratio of the aspect ratio of image data 16 for image 12 and the aspect ratio of display device 26. For example, in the illustrative embodiment described above, image data 16 has an aspect ratio of 16:9 and display device 26 has an aspect ratio of 4:3. As such, image display system 10 optically scales displayed image 14 by a factor of 4/3 (i.e., (16/9)/(4/3)) in the direction of increased resolution. Thus, image display system 10 stretches displayed image 14 in the horizontal direction without visibly distorting displayed image 14. In addition, since a resolution of displayed image portion 15 is increased in the horizontal direction, resolution of displayed image 14 is not compromised when pixels forming displayed image portion 15 are optically scaled in the horizontal direction.

Figure 11:
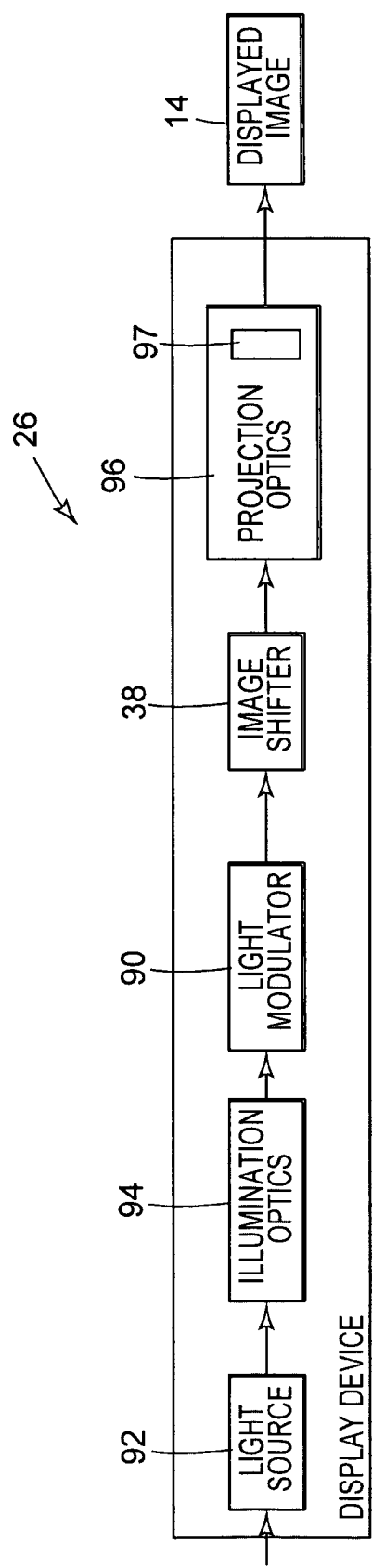
FIG. 11 is a schematic illustration of one embodiment of a display device according to the present invention.

FIG. 11 illustrates one embodiment of display device 26 for image display system 10. In one embodiment, as described above, display device 26 includes a light modulator 90 for modulation of incident light. In one embodiment, light modulator 90 includes a plurality of micro-mirror devices arranged to form an array of micro-mirror devices. As such, each micro-mirror device constitutes one cell or pixel of display device 26.

In one embodiment, as illustrated in FIG. 11, display device 26 also includes a light source 92, illumination optics 94, projection optics 96, and image shifter 38. Light source 92 produces light for display device 26 and illumination optics 94 direct the light to light modulator 90. As such, light modulator 90 modulates the light and projection optics 96 collect and focus the light to produce displayed image 14.

Illumination optics 94 include, for example, a color wheel, an integrating rod, and condensing optics each positioned in an optical path between light source 92 and light modulator 90. As such, illumination optics 94 produce and direct uniform light to light modulator 90. Light modulator 90 modulates light received from illumination optics 94 to produce displayed image 14 from, for example, image sub-frames 30.

Projection optics 96 include, for example, one or more optical or projection elements positioned in an optical path after light modulator 90 for refraction, reflection, and/or diffraction of light from light modulator 90. As such, projection optics 96 project image sub-frames 30 to form displayed image 14. As described above, image shifter 38 shifts display of image sub-frames 30 to produce displayed image 14.

In one embodiment, projection optics 96 optically scale the displayed images produced by first sub-frame 301 and second sub-frame 302, as described above. As such, projection optics 96 include one or more optical elements which scale or stretch the displayed images in one direction. In one embodiment, projection optics 96 include an anamorphic lens 97 which can be positioned in the optical path after light modulator 90 to optically scale or stretch the displayed images in one direction.

Anamorphic lens 97 has a modification factor equal to the desired scaling of displayed image 14. Thus, in one embodiment, anamorphic lens 97 has a modification factor equal to the ratio of the aspect ratio of image data 16 for image 12 and the aspect ratio of display device 26. For example, in the illustrative embodiment described above, anamorphic lens 97 has a modification factor of 4/3 (i.e., (16/9)/(4/3)).

In one embodiment, as illustrated in FIG. 11, image shifter 38 is positioned in an optical path after light modulator 90 and before projection optics 96. As such, image shifter 38 can shift display of image sub-frames 30 for image frame 28 before projection by projection optics 96. Additional embodiments of image shifter 38 are described, for example, in related U.S. patent application Ser. No. 10/242,545, assigned to the assignee of the present invention and incorporated herein by reference.

While the aspect ratios of image data 16 for image 12 and display device 26 are illustrated and described as being 16:9 and 4:3, respectively, it is understood that other aspect ratios of image data 16 and display device 26 are within the scope of the present invention. In addition, while image sub-frames 30 for image 12 are illustrated and described as being offset and displayed in the horizontal direction, it is understood that image sub-frames 30 may be offset and displayed in the vertical direction. As such, image display system 10 can be used to optically scale the displayed images in the vertical direction. In addition, the modification factor of anamorphic lens 97 may be varied to vary the optical scaling of displayed image 14.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image having a first aspect ratio with a display device having a second aspect ratio, the method comprising:
   receiving image data for a frame of the image in the first aspect ratio;
   displaying a displayed image for the frame of the image with the display device, including increasing a resolution of the displayed image in one direction; and
   optically scaling the displayed image in the one direction to create the second aspect ratio,
   wherein receiving the image data includes defining a first sub-frame and a second sub-frame spatially offset from the first sub-frame in the one direction for the frame of the image, and wherein displaying the displayed image includes alternating between displaying the first sub-frame in a first position and the second sub-frame in a second position spatially offset from the first position.

2. The method of claim 1, wherein receiving the image data further includes buffering the image data and creating the frame of the image at the first aspect ratio, and wherein defining the first sub-frame and the second sub-frame for the frame of the image includes defining the first sub-frame and the second sub-frame at the second aspect ratio.

3. The method of claim 1, wherein alternating between displaying the first sub-frame and the second sub-frame includes overlapping pixels of the first sub-frame and pixels of the second sub-frame in the one direction to increase the resolution of the displayed image in the one direction.

4. The method of claim 1, wherein optically scaling the displayed image includes optically scaling the displayed image by a ratio of the first aspect ratio and the second aspect ratio.

5. A system for displaying an image having a first aspect ratio, the system comprising:
   an image processing unit adapted to receive a frame of the image; and
   a display device having a second aspect ratio and adapted to produce a displayed image for the frame of the image,
   wherein the display device is adapted to increase a resolution of the displayed image in one direction and optically scale the displayed image in the one direction,
   wherein the image processing unit is adapted to define a first sub-frame and a second sub-frame spatially offset from the first sub-frame in the one direction for the frame of the image, and wherein the display device is adapted to alternately display the first sub-frame in a first position and the second sub-frame in a second position spatially offset from the first position.

6. The system of claim 5, further comprising:
   a buffer adapted to receive the image data and buffer the image data to create the frame of the image at the first aspect ratio, and
   wherein the image processing unit is adapted to define the first sub-frame and the second sub-frame at the second aspect ratio.

7. The system of claim 5, wherein the display device is adapted to overlap pixels of the first sub-frame and pixels of the second sub-frame in the one direction to increase the resolution of the displayed image in the one direction.

8. The system of claim 5, wherein the display device is adapted to optically scale the displayed image by a ratio of the first aspect ratio and the second aspect ratio.

* * * * *